US008650136B2

(12) United States Patent
Goyal

(10) Patent No.: US 8,650,136 B2
(45) Date of Patent: Feb. 11, 2014

(54) TEXT CLASSIFICATION WITH CONFIDENCE GRADING

(75) Inventor: Ram Dayal Goyal, Bangalore (IN)

(73) Assignee: Ketera Technologies, Inc., San Jose, CA (US)

( * ) Notice: Subject to any disclaimer, the term of this patent is extended or adjusted under 35 U.S.C. 154(b) by 300 days.

(21) Appl. No.: 13/084,584

(22) Filed: Apr. 12, 2011

(65) Prior Publication Data

US 2012/0221496 A1   Aug. 30, 2012

(30) Foreign Application Priority Data

Feb. 24, 2011   (IN) .............................. 543/CHE/2011

(51) Int. Cl.
 *G06F 15/18* (2006.01)
(52) U.S. Cl.
 USPC ........................................................ 706/12
(58) Field of Classification Search
 USPC ........................................................ 706/12
 See application file for complete search history.

(56) References Cited

U.S. PATENT DOCUMENTS

| | | | |
|---|---|---|---|
| 6,687,705 B2 | 2/2004 | Agrawal et al. | |
| 7,031,530 B2 | 4/2006 | Driggs et al. | |
| 7,165,068 B2 | 1/2007 | Dedhia et al. | |
| 7,167,858 B2 | 1/2007 | Naeymi-Rad et al. | |
| 2007/0038625 A1* | 2/2007 | Yang-Stephens et al. | 707/6 |
| 2009/0094178 A1* | 4/2009 | Aoki | 706/20 |

OTHER PUBLICATIONS

Introduction to Information Retrieval, by Manning, Cambridge University Press, Chapter 13: Text Classification and Naïve Bayes, published Apr. 2009.*
Robust Bayes Classifiers, by Ramoni, published Jan. 2001 in view of A Comparative Study on Term Weighting Schemes for Text Categorization, by Lan, published Aug. 2005.*
A Comparative Study on Term Weighting Schemes for Text Categorization, by Lan, published Aug. 2005 in view of Classification of Text Documents, by Li, published 1998.*

* cited by examiner

*Primary Examiner* — Jeffrey A Gaffin
*Assistant Examiner* — Thomas Fink
(74) *Attorney, Agent, or Firm* — Ash Tankha; Lipion, Weinberger & Husick

(57) ABSTRACT

A computer implemented method and system is provided for classifying a document. A classifier is trained using training documents. A list of first words is obtained from the training documents. A prior probability is determined for each class of multiple classes. Conditional probabilities are calculated for the first words for each class. Confidence thresholds are determined. Confidence grades are defined for the classes using the confidence thresholds. A list of second words is obtained from the document. Conditional probabilities for the list of second words are determined from the calculated conditional probabilities for the list of first words. A posterior probability is calculated for each of the classes and compared with the determined confidence thresholds. Each class is assigned to one of the defined confidence grades based on the comparison. The document is assigned to one of the classes based on the posterior probability and the assigned confidence grades.

14 Claims, 12 Drawing Sheets

| SL NO | CLASS NAME | TRAINING DOCUMENTS | DATA IN THE TRAINING DOCUMENTS |
|---|---|---|---|
| 1 | SPORT | TRAINING DOCUMENT 1 | CRICKET CHAMPIONSHIP |
| | | TRAINING DOCUMENT 2 | FOOTBALL ASSOCIATION |
| | | TRAINING DOCUMENT 3 | TENNIS TOURNAMENT |
| 2 | SCIENCE | TRAINING DOCUMENT 4 | DISCOVERY OF NEW PLANET |
| | | TRAINING DOCUMENT 5 | ETHYL-ALCOHOL PROCESS |
| | | TRAINING DOCUMENT 6 | NEWTON'S LAWS OF MOTION 55 |
| | | TRAINING DOCUMENT 7 | ASIMO ROBOTS |
| 3 | POLITICS | TRAINING DOCUMENT 8 | MEMBER OF PARLIAMENT |
| | | TRAINING DOCUMENT 9 | PRIME MINISTER |

FIG. 5

| LIST OF FIRST WORDS | LIST OF FIRST WORDS AFTER REMOVING STOP WORDS AND DIGITS | LIST OF FIRST WORDS AFTER STEMMING EACH OF FIRST WORDS |
|---|---|---|
| CRICKET, CHAMPIONSHIP, FOOTBALL, ASSOCIATION, TENNIS, TOURNAMENT, DISCOVERY, OF, NEW PLANET, ETHYL-ALCOHOL, PROCESS, NEWTON'S, LAWS, OF, MOTION, 55, ASIMO, ROBOTS, MEMBER, OF, PARLIAMENT, PRIME MINISTER | CRICKET, CHAMPIONSHIP, FOOTBALL, ASSOCIATION, TENNIS, TOURNAMENT, DISCOVERY, PLANET, ETHYL, ALCOHOL, PROCESS, NEWTON'S, LAW, MOTION, ASIMO, ROBOTS, MEMBER PARLIAMENT, PRIME, MINISTER | CRICKET, CHAMPIONSHIP, FOOTBALL, ASSOCIATION, TENNIS TOURNAMENT, DISCOVERY, PLANET, ETHYL, ALCOHOL, PROCESS, NEWTON, LAW, MOTION, ASIMO, ROBOT, MEMBER, PARLIAMENT, PRIME, MINISTER |

FIG. 6

| SL NO | CLASS NAME | PRIOR PROBABILITY |
|---|---|---|
| 1 | SPORT | P(SPORT) = 3/9 |
| 2 | SCIENCE | P(SCIENCE) = 4/9 |
| 3 | POLITICS | P(POLITICS) = 2/9 |

FIG. 7

| LIST OF FIRST WORDS WITH FREQUENCY OF OCCURRENCE GREATER THAN A PREDETERMINED FREQUENCY OF OCCURRENCE | CRICKET, CHAMPIONSHIP, FOOTBALL ASSOCIATION, TENNIS, TOURNAMENT, DISCOVERY, PLANET, ETHYL, ALCOHOL, PROCESS, NEWTON, LAW, MOTION, ASIMO, ROBOT, MEMBER, PARLIAMENT, PRIME, MINISTER |
|---|---|

FIG. 8

| CLASS NAME | SPORT | SCIENCE | POLITICS |
|---|---|---|---|
| NO OF TRAINING DOCUMENTS IN THE CLASS | 3 | 4 | 2 |
| PRIOR PROBABILITY | Pr(SPORT) = 3/9 | Pr(SCIENCE) = 4/9 | Pr(POLITICS) = 2/9 |
| TOTAL WORDS IN EACH CLASS | 6 | 10 | 4 |
| TOTAL UNIQUE WORDS IN EACH CLASS | 6 | 10 | 4 |
| $S_{avg}$ | 6/3 = 2 | 10/4 = 2.5 | 4/2 = 2 |
| $F_{avg}$ | 6/6 = 1 | 10/10 = 1 | 4/4 = 1 |
| $P_h$ | -2.410836909 | -2.713660243 | -2.727164533 |
| $P_m$ | -2.553368071 | -2.885818577 | -2.831678085 |
| $P_l$ | -2.748149302 | -3.186897575 | -3.004277448 |

FIG. 9

| DATA IN DOCUMENT | LIST OF SECOND WORDS | LIST OF SECOND WORDS AFTER REMOVING STOP WORDS AND DIGITS | LIST OF SECOND WORDS AFTER STEMMING EACH OF SECOND WORDS | LIST OF SECOND WORDS COMMONLY PRESENT IN THE LIST OF FIRST WORDS |
|---|---|---|---|---|
| PARLIAMENT 3 NEW PACTS | PARLIAMENT, 3 NEW, PACTS | PARLIAMENT, PACTS | PARLIAMENT, PACT | PARLIAMENT |

FIG. 10

| CLASS NAME | CONDITIONAL PROBABILITIES FOR THE LIST OF SECOND WORDS | POSTERIOR PROBABILITY | LOGARITHM WITH BASE 10 OF POSTERIOR PROBABILITY | CONFIDENCE GRADE |
|---|---|---|---|---|
| POLITICS | (1+1)/(4+20) | 0.01851 | -1.73239 | "TOP" |
| SCIENCE | 1/(10+20) | 0.01481 | -1.82930 | "TOP" |
| SPORT | 1/(6+20) | 0.01282 | -1.89209 | "TOP" |

FIG. 11

|  | CONDITIONAL PROBABILITY | | |
|---|---|---|---|
| FIRST WORD | SPORT | SCIENCE | POLITICS |
| CRICKET | (1+1)/(6+20) | (1)/(10+20) | (1)/(4+20) |
| CHAMPIONSHIP | (1+1)/(6+20) | (1)/(10+20) | (1)/(4+20) |
| FOOTBALL | (1+1)/(6+20) | (1)/(10+20) | (1)/(4+20) |
| ASSOCIATION | (1+1)/(6+20) | (1)/(10+20) | (1)/(4+20) |
| TENNIS | (1+1)/(6+20) | (1)/(10+20) | (1)/(4+20) |
| TOURNAMENT | (1+1)/(6+20) | (1)/(10+20) | (1)/(4+20) |
| DISCOVERY | (1)/(6+20) | (1+1)/(10+20) | (1)/(4+20) |
| PLANET | (1)/(6+20) | (1+1)/(10+20) | (1)/(4+20) |
| ETHYL | (1)/(6+20) | (1+1)/(10+20) | (1)/(4+20) |
| ALCOHOL | (1)/(6+20) | (1+1)/(10+20) | (1)/(4+20) |
| PROCESS | (1)/(6+20) | (1+1)/(10+20) | (1)/(4+20) |
| NEWTON | (1)/(6+20) | (1+1)/(10+20) | (1)/(4+20) |
| ASIMO | (1)/(6+20) | (1+1)/(10+20) | (1)/(4+20) |
| ROBOT | (1)/(6+20) | (1+1)/(10+20) | (1)/(4+20) |
| LAW | (1)/(6+20) | (1)/(10+20) | (1)/(4+20) |
| MOTION | (1)/(6+20) | (1)/(10+20) | (1)/(4+20) |
| MEMBER | (1)/(6+20) | (1)/(10+20) | (1+1)/(4+20) |
| PARLIAMENT | (1)/(6+20) | (1)/(10+20) | (1+1)/(4+20) |
| PRIME | (1)/(6+20) | (1)/(10+20) | (1+1)/(4+20) |
| MINISTER | (1)/(6+20) | (1)/(10+20) | (1+1)/(4+20) |

FIG. 12

TEXT CLASSIFICATION WITH CONFIDENCE GRADING

CROSS REFERENCE TO RELATED APPLICATIONS

This application claims the benefit of non-provisional patent application number 543/CHE/2011 titled "Text Classification With Confidence Grading", filed on Feb. 24, 2011 in the Indian Patent Office.

The specification of the above referenced patent application is incorporated herein by reference in its entirety.

BACKGROUND

The computer implemented method and system disclosed herein, in general, relates to document classification. More specifically, the computer implemented method and system disclosed herein relates to classifying a document using confidence grades.

A large quantity of information that may be public or non-public is typically available to a user to facilitate the performance of a task. The information available to the user may often influence the user's decisions and course of action. The information may be in the form of text stored in a file or a document. The information may also be stored in a computer readable format. Most often, the information may not be classified, that is, the user may be uncertain about the content of the information that is available. The uncertainty about the information may require the user to manually access the complete information. In other instances, information accessible may be in the public domain. For example, a text file containing a description about a cricket bat may be classified into a class representing "cricket sport" instead of "sporting goods". The classification may require a manual check of information causing unnecessary time consumption. Therefore, classification of such information prior to the access of such information by the user will be advantageous. The information may also need to be confidently classified into one of many classes. The classes may represent the type of data such as sports, science, politics, amusement, etc.

Classifiers using different theorems may be used for classifying the information. For example, the classifiers utilizing Bayesian theorem, linguistic methods, vector space model, etc., may be used to classify the document into one of the classes. The accuracy of the classifiers may be low. A Bayesian classifier utilizes the Bayesian theorem for text classification. Conventionally, the Bayesian classifier uses training documents for the classification. Each of the training documents is classified into one of the classes. An appropriate target class is determined for a document to be classified. Due to unavailability of perfect training documents in a few cases, the resultant classification given by the Bayesian classifier may be incorrect. The resultant classification may also occur at a lower position in array of the classes. Moreover, posterior probability calculated by the Bayesian classifier may lie close to 0 or 1. The posterior probability may not indicate appropriate relevance. The absence of appropriate relevance indication may require the user to verify results manually.

Hence, there is a long felt but unresolved need for a computer implemented method and system that classifies a document using confidence grades to eliminate manual intervention for classifying the document.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for classifying a document using confidence grades. A classifier is trained using training documents. The classifier is, for example, a Naïve Bayes classifier. Multiple training documents classified into one of multiple classes are provided to the classifier. The training documents comprise, for example, alphanumeric data. In order to train the classifier, a list of first words is obtained from the training documents. The list of first words is modified to remove stop words, numeric digits, etc. A prior probability is determined for each of the classes. The prior probability is the probability of occurrence of the training documents in the class, given the training documents in the classes. Multiple threshold constants are defined based on empirical evaluations. The threshold constants comprise, for example, a high threshold constant, a medium threshold constant, and a low threshold constant. Conditional probabilities are then calculated for each of the first words in the list of first words based on frequency of occurrence of each of the first words in the class. The confidence thresholds are then calculated for each class based on average frequency of occurrence of each of the first words, average size of each of the training documents, the prior probability, and the threshold constants.

A list of second words is obtained from a document to be classified. The list of second words is modified to remove stop words, numeric digits, etc. The second words those that are commonly present in the list of first words. Conditional probabilities for the list of second words for each of the classes are determined from the calculated conditional probabilities for the list of first words. A posterior probability is calculated for each of the classes using the prior probability and the determined conditional probabilities for each of the second words.

The calculated posterior probability is compared with the determined confidence thresholds for each of the classes. Each of the classes is assigned to one of the defined confidence grades for classifying the document. The document is assigned to one of the classes based on the calculated posterior probability and the assigned confidence grades for each of the classes. The calculated posterior probabilities for each of the classes are, for example, arranged in a decreasing order. The class with the calculated posterior probability comparatively greater than the calculated posterior probability of each of other classes is then assigned as the result class of the document. The document is thereby classified into one of the classes using the trained classifier.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 5 exemplarily illustrates class names, training documents belonging to each of multiple classes, and data in each of the training documents.

FIG. 6 exemplarily illustrates the list of first words before and after removing stop words, numeric digits, and stemming each of the first words.

FIG. 7 exemplarily illustrates the prior probability determined for each of the classes.

FIG. 8 exemplarily illustrates the list of first words with frequency of occurrence greater than a predetermined value.

FIG. 9 exemplarily illustrates determination of prior probability, average size of each of the training documents, average frequency of occurrence of each of first words, and confidence thresholds for each of the classes.

FIG. 10 exemplarily illustrates obtaining a list of second words from a document, removing the stop words and numeric digits, stemming each of second words and retaining the second words commonly present in the list of first words.

FIG. 11 exemplarily illustrates conditional probabilities, posterior probability, logarithm with base 10 of the posterior probability, and confidence grades of each of the classes.

FIG. 12 exemplarily illustrates conditional probabilities calculated for the list of first words for each of the classes.

DETAILED DESCRIPTION OF THE INVENTION

Figure 1A:
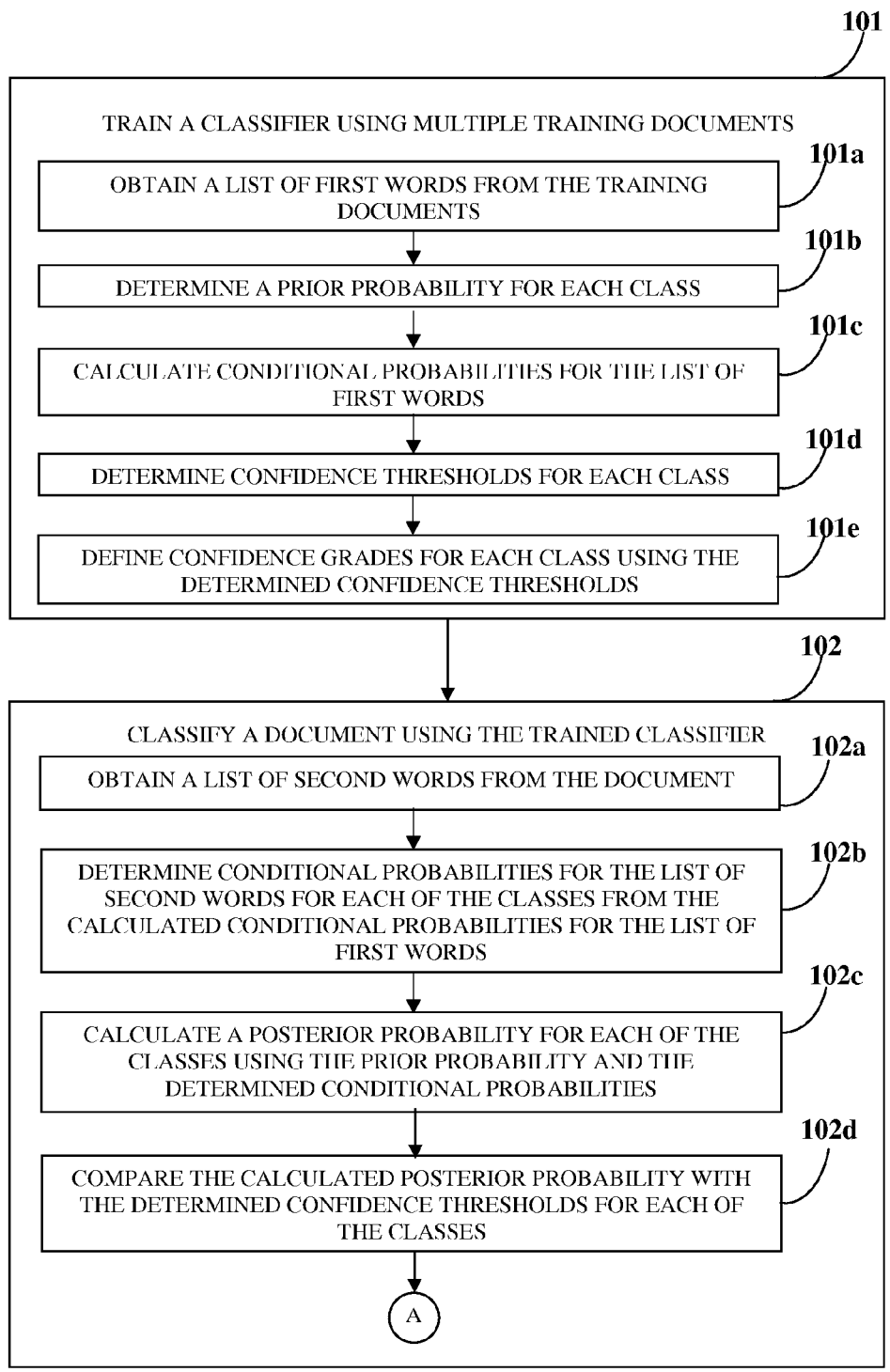
FIGS. 1A-1B illustrate a computer implemented method for classifying a document using confidence grades.
Figure 1B:
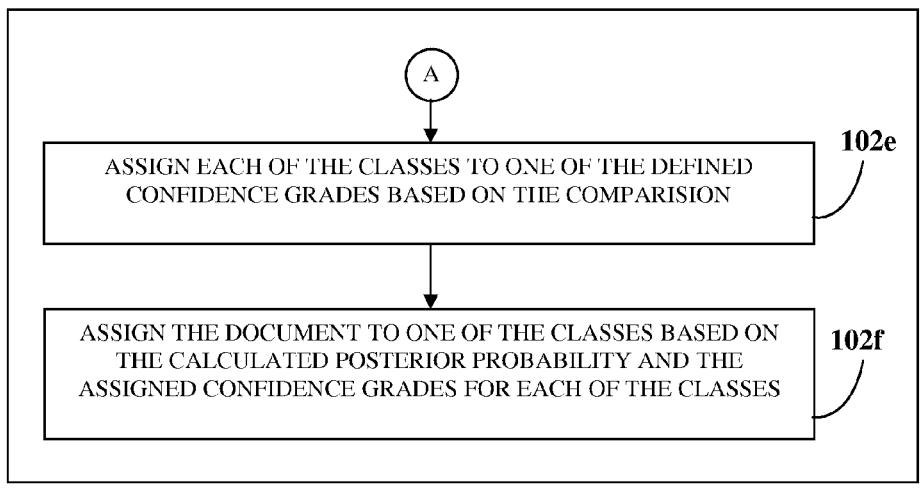
Figure 2:
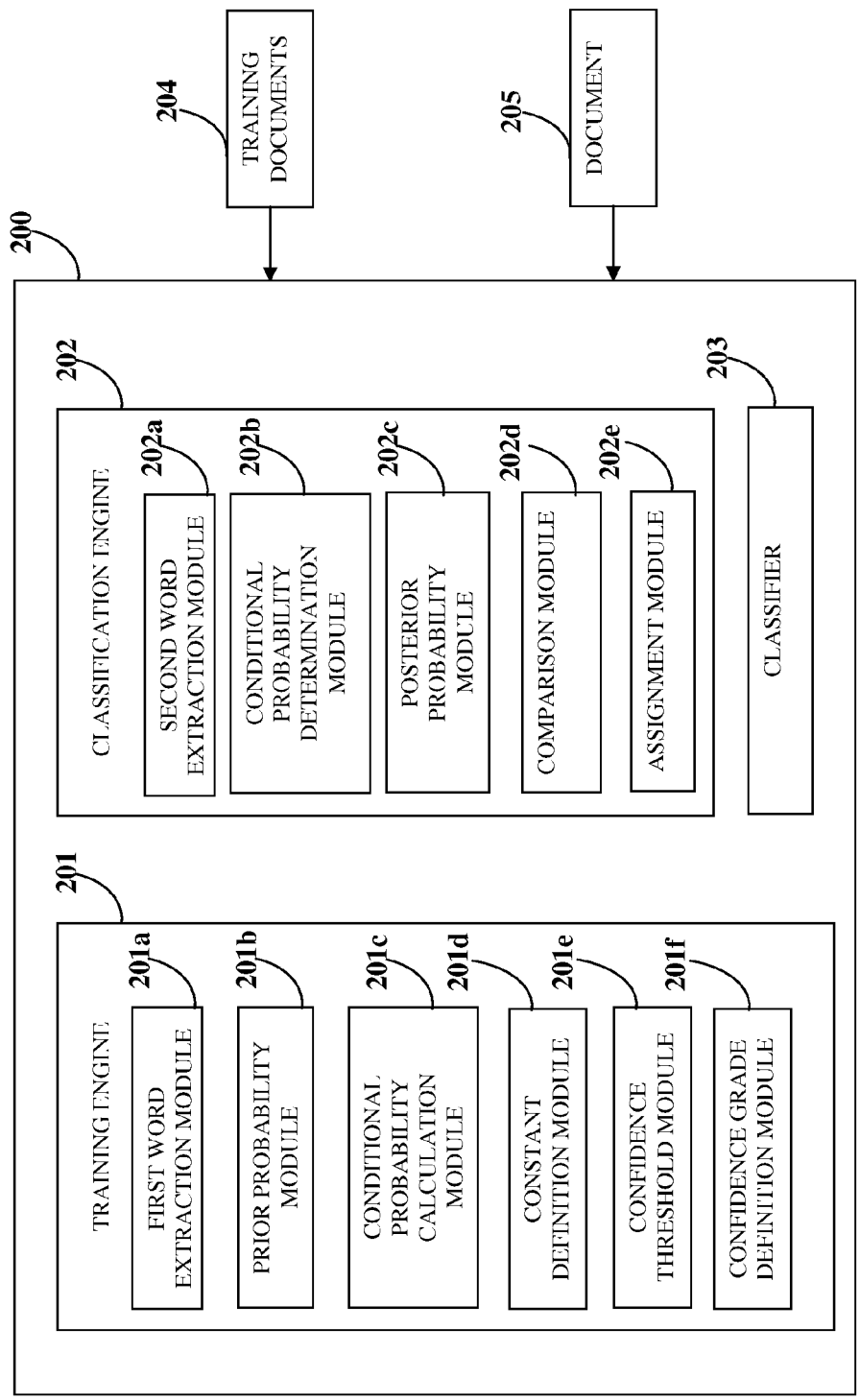
FIG. 2 illustrates a computer implemented system for classifying a document using confidence grades.

FIGS. 1A-1B illustrate a computer implemented method for classifying a document 205 using confidence grades. A classifier 203, as illustrated in FIG. 2, is trained 101 using multiple training documents 204. The classifier 203 is, for example, a Naïve Bayes classifier. The training documents 204 comprise, for example, data in machine readable format. The data comprise, for example, alphanumeric data, for example, text, numeric digits, and symbols, etc. Multiple training documents 204 classified into one of multiple classes are provided to a classifier 203. Each of the training documents 204 comprises, for example, a class tag. The class tag comprises, for example, a class code and a class description. The class code provides a unique identification for each of the classes. The class description provides information about the class. The classes used to represent the training documents 204 may belong to a coding system used to classify items. The items comprise, for example, readable text information. Coding systems used to represent classified items are, for example, United Nations Standard Products and Services Code (UNSPSC), North American Industry Classification System (NAICS), etc.

In an embodiment, the classifier 203 is trained by obtaining 101a a list of first words from the training documents 204. The list of first words is modified by removing stop words present in the list of first words. The stop words are, for example, the following words: the, that, is, of, who, etc. After removing the stop words, numeric digits present in the list of first words are removed. The remaining first words are then stemmed by obtaining the stem of the word. For example, the stem of a word is obtained by reducing the word from its inflected form. Consider the words process, processor, processing. The stem of the words is process. Frequency of occurrence of each of the first words in each of the classes is determined. The first words with a frequency of occurrence less than a predetermined value may also be removed. For example, the first words with a frequency of occurrence less that 3 are removed. A single copy of each of first words may be retained. The modified list of first words may be stored in a first word file. The modified list of first words is used by the Naïve Bayes classifier. The Naïve Bayes classifier uses the Bayes theorem. The Bayes theorem is, for example, applied to a document 205 "d" for a class j "cj" as follows:

$$\text{Bayes}(d) = \underset{c_j \in C}{\operatorname{argmax}} Pr(c_j \mid d)$$

$$\Rightarrow \underset{c_j \in C}{\operatorname{argmax}} \frac{Pr(d \mid c_j) \times Pr(c_j)}{Pr(d)}$$

$$\Rightarrow \underset{c_j \in C}{\operatorname{argmax}} \frac{Pr(w_1, w_2, \ldots, w_n \mid c_j) \times Pr(c_j)}{Pr(d)}$$

$$\approx \underset{c_j \in C}{\operatorname{argmax}} \prod_{i=1}^{n} Pr(wi \mid cj) \times Pr(cj)$$

$$\approx \underset{c_j \in C}{\operatorname{argmax}} \left( \text{Log}\left( Pr(c_j) + \sum_{i=1}^{n} \log Pr(wi \mid cj) \right) \right)$$

Where, Bayes(d) determines the class of the document 205 "d" using the Bayes theorem, "wi" is the first word i in the list of first words, "n" is the number of first words, "C" is the group of classes to which the class j belongs, Pr(cj) is the prior probability of class j, and Pr(wi|cj) is the conditional probability of the first word i in the class j. In an example, the prior probability Pr(cj) and the conditional probability Pr(wi|cj) is calculated as follows:

$$Pr(c_j) = \frac{|Tdocs \in c_j|}{|Tdocs|}, \text{ and}$$

$$Pr(wi \mid c_j) = \frac{Fij + 1}{|words_j| + |n|}$$

Where, Tdocs represents the total number of training documents 204, Fij is the frequency of the first word i in class j, n is the number of first words in the list of first words, and wordsj is the first words present in class j.

For each class belonging to the group of classes, the prior probability is determined 101b using the training documents 204. The prior probability of the class j is the probability of occurrence of the training documents 204 in the class j, given the training documents 204 in the classes. The prior probability is defined as a ratio of number of training documents in a class to total number of training documents 204. The prior probability of each of the classes is stored in a first text file. In an example, the prior probability of the class j is calculated as follows:

$$Pr(c_j) = \frac{|Tdocs \in cj|}{|Tdocs|}$$

Where, Pr(cj) is the prior probability of the class j. Conditional probabilities are calculated 101c for each of the classes for the list of first words. The calculated conditional probabilities for each of the classes are stored in a second text file. The conditional probability of the first word i is probability of occurrence of the first word i in the given class. For example, the conditional probability of the first word i in the class j is calculated as follows:

$$Pr(w_i \mid c_j) = \frac{Fij+1}{|Words_j|+|n|}.$$

Where,

Fij=Frequencyof first word i in the class j
$Words_j$=All the first words ∈ class j A minimum posterior probability and a maximum posterior probability are calculated for each of the classes. For example, the minimum posterior probability for the class j is calculated as follows:

$$\text{Min } Pr(cj \mid d) = \log(Pr(cj)) + n * \log\left(\frac{1}{|\text{words in } cj|+|n|}\right),$$

and the maximum posterior probability for the class j is calculated as follows:

$$\text{Max } Pr(cj \mid d) = \log(Pr(cj)) + Savg * \log\left(\frac{Favg * |Tdocs \in cj|+1}{|\text{words in } cj|+|n|}\right).$$

Where, n is the number of first words, words in cj are the words present in class j, and Savg is the average size of each of the training documents 204, given by:

$$Savg = \frac{\text{Total number of words in all training documents} \in cj}{\text{Total number of documents} \in cj}$$

and $$Favg = \frac{\text{The first words in the training documents} \in cj}{\text{The total number of unique first words} \in cj}$$

The minimum and maximum posterior probabilities calculated for each of the classes are evaluated empirically across a number of experimentations. The empirical evaluation leads to definition of multiple threshold constants. The threshold constants may be commonly defined for each of the classes. The threshold constants comprise, for example, a high threshold constant (Th), a medium threshold constant (Tm), and a low threshold constant (Tl). The value of high threshold constant (Th) is, for example, a logarithm of 4 with base 10. The value of medium threshold constant (Tm) is, for example, a logarithm of 3 with base 10. The value of low threshold constant (Tl) is, for example, a logarithm of 2 with base 10.

Multiple confidence thresholds are then determined 101d for each of the classes using the list of first words, the prior probability of the class, and one of the threshold constants. The prior probability used is of the same class for which the confidence thresholds are determined. The confidence thresholds comprise, for example, a high confidence threshold ($P_h$), a medium confidence threshold ($P_m$), and a low confidence threshold ($P_l$). For example, for the class j, the high confidence threshold is determined as follows:

$$P_h = \log(Pr(cj)) + Savg * \log\left(\frac{Favg * |Tdocs \in cj| * Th+1}{|\text{words in } cj|+|n|}\right).$$

The medium confidence threshold is determined as follows:

$$P_m = \log(Pr(cj)) + Savg * \log\left(\frac{Favg * |Tdocs \in cj| * Tm+1}{|\text{words in } cj|+|n|}\right).$$

The low confidence threshold is determined as follows:

$$P_l = \log(Pr(cj)) + Savg * \log\left(\frac{Favg * |Tdocs \in cj| * Tl+1}{|\text{words in } cj|+|n|}\right).$$

Where, Favg is average frequency of each of the first words, given by:

$$Favg = \frac{\text{The first words in the training documents} \in cj}{\text{The total number of unique first words} \in cj}$$

and Pr(cj)=prior probability of the class j.

The confidence grades are defined 101e for each of the classes using the determined confidence thresholds. The defined confidence grades comprise, for example, a top confidence grade, a high confidence grade, a medium confidence grade, and a low confidence grade. The top confidence grade is defined to lie above the high confidence threshold. The high confidence grade is defined to lie within the high confidence threshold and above the medium confidence threshold. The medium confidence grade is defined to lie within the medium confidence threshold and above the low confidence threshold. The low confidence grade is defined to lie within the low confidence threshold. The determined confidence thresholds for each of the classes are stored in a second file having a computer readable format.

The minimum and maximum posterior probabilities are calculated to show ranges of the calculated confidence thresholds for each class within the calculated minimum and maximum posterior probabilities. Therefore, a predefined value of confidence threshold for each class is unreliable to define the confidence grades. Hence, multiple confidence thresholds are determined for each class for defining the confidence grades.

The document 205 is then classified 102 using the trained classifier 203 by first obtaining 102a a list of second words from the document 205. The list of second words is modified by removing stop words and numeric digits. Each of the remaining second words may be stemmed and further modified by removing words that are not commonly present in the list of first words. The modified list of second words is stored in a second word file. Conditional probabilities for the list of second words for each of the classes are determined 102b from the calculated conditional probabilities for the list of first words. The conditional probabilities for the list of second words for each of the classes are determined, for example, by reading from the second text file comprising the calculated conditional probabilities for the list of first words.

A posterior probability is calculated 102c for each of the classes using the prior probability and the determined conditional probabilities. The prior probability and the determined conditional probabilities belong to the same class for which the posterior probability is calculated. For example, the posterior probability of the class j is calculated as follows:

$$Pr(cj \mid d) = \log(Pr(cj)) + \sum_{i=1}^{n} \log(Pr(w_i \mid cj)).$$

Where, $$\sum_{i=1}^{n} \log(Pr(w_i \mid cj))$$

is the summation of logarithm with base 10 of the conditional probabilities calculated for the class j.

$$\sum_{i=1}^{n} \log(Pr(w_i \mid cj)) =$$
$$\log(Pr(w1 \mid cj)) + \log(Pr(w2 \mid cj)) + \log(Pr(w3 \mid cj)) + \log(Pr(w4 \mid cj)).$$

The calculated posterior probability is compared 102d with the determined confidence thresholds for each of the classes. Each of the classes is assigned 102e to one of the confidence grades based on the comparison. The classes with the calculated posterior probability greater than the high confidence threshold are, for example, assigned a confidence grade of "top". The classes with the calculated posterior probability greater than the medium confidence threshold are, for example, assigned a confidence grade of "high". The classes with the calculated posterior probability greater than the low confidence threshold are, for example, assigned a confidence grade of "medium". The classes with the calculated posterior probability lesser than the low confidence threshold are, for example, assigned a confidence grade of "low".

The document 205 is assigned 102f to one of the classes based on the calculated posterior probability and the assigned confidence grades for each of the classes. The posterior probability of each of the classes is, for example, arranged in a decreasing order on comparison. The class with the calculated posterior probability comparatively greater than the calculated posterior probability of each of other classes is assigned as result class of the document 205. The document 205 acquires the class tag of the assigned class.

FIG. 2 illustrates a computer implemented system 200 for classifying a document 205 using confidence grades. The computer implemented system 200 disclosed herein comprises a training engine 201, a classification engine 202, and a classifier 203. The training engine 201 comprises a first word extraction module 201a, a prior probability module 201b, a conditional probability calculation module 201c, a constant definition module 201d, a confidence threshold module 201e, and a confidence grade definition module 201f.

The training engine 201 trains the classifier 203 using multiple training documents 204. The multiple training documents 204 classified into one of multiple classes are provided to the classifier 203. The first word extraction module 201a obtains a list of first words from the training documents 204. The first word extraction module 201a removes stop words from the list of first words, removes numeric digits from the list of first words, stems each of the first words in the list of first words, and determines frequency of occurrence of each of the first words in each of the classes. The first word extraction module 201a removes the first words with the frequency of occurrence less than a predetermined value from the list of first words.

The prior probability module 201b determines prior probability of each class belonging to the classes. The conditional probability calculation module 201c calculates conditional probabilities for the list of first words for each class. The conditional probabilities for the classes are determined using the list of first words, the frequency of occurrence of each of the first words in the class. The constant definition module 201d defines threshold constants. The threshold constants comprise, for example, a high threshold constant, a medium threshold constant, and a low threshold constant. The confidence threshold module 201e determines confidence thresholds for the class using the determined first prior probabilities, average size of each of the training documents 204, average frequency of occurrence of each of the training documents 204 and the threshold constants. The confidence grade definition module 201f defines confidence grades for the classes using the determined confidence thresholds.

The classification engine 202 comprises a second word extraction module 202a, a conditional probability determination module 202b, a posterior probability module 202c, a comparison module 202d, and an assignment module 202e. The classification engine 202 uses the trained classifier 203 for classifying the document 205. The second word extraction module 202a obtains a list of second words from the document 205. The second word extraction module 202a removes stop words from the list of second words, removes numeric digits from the list of second words, and stems each of the second words in the list of first words. The conditional probability determination module 202b determines conditional probabilities for the list of second words for each of the classes from the calculated conditional probabilities for the list of first words.

The posterior probability module 202c calculates a posterior probability for each of the classes using the determined prior probability and the determined conditional probabilities. The comparison module 202d compares the calculated posterior probability with the determined confidence thresholds for each of the classes. The assignment module 202e assigns one of the confidence grades to each of the classes based on the comparison of calculated posterior probability and the determined confidence thresholds for each of the classes. The assignment module 202e assigns the document 205 to one of the classes as the result class of the document 205 based on the calculated posterior probability and the assigned confidence grades for each of the classes.

Figure 3:
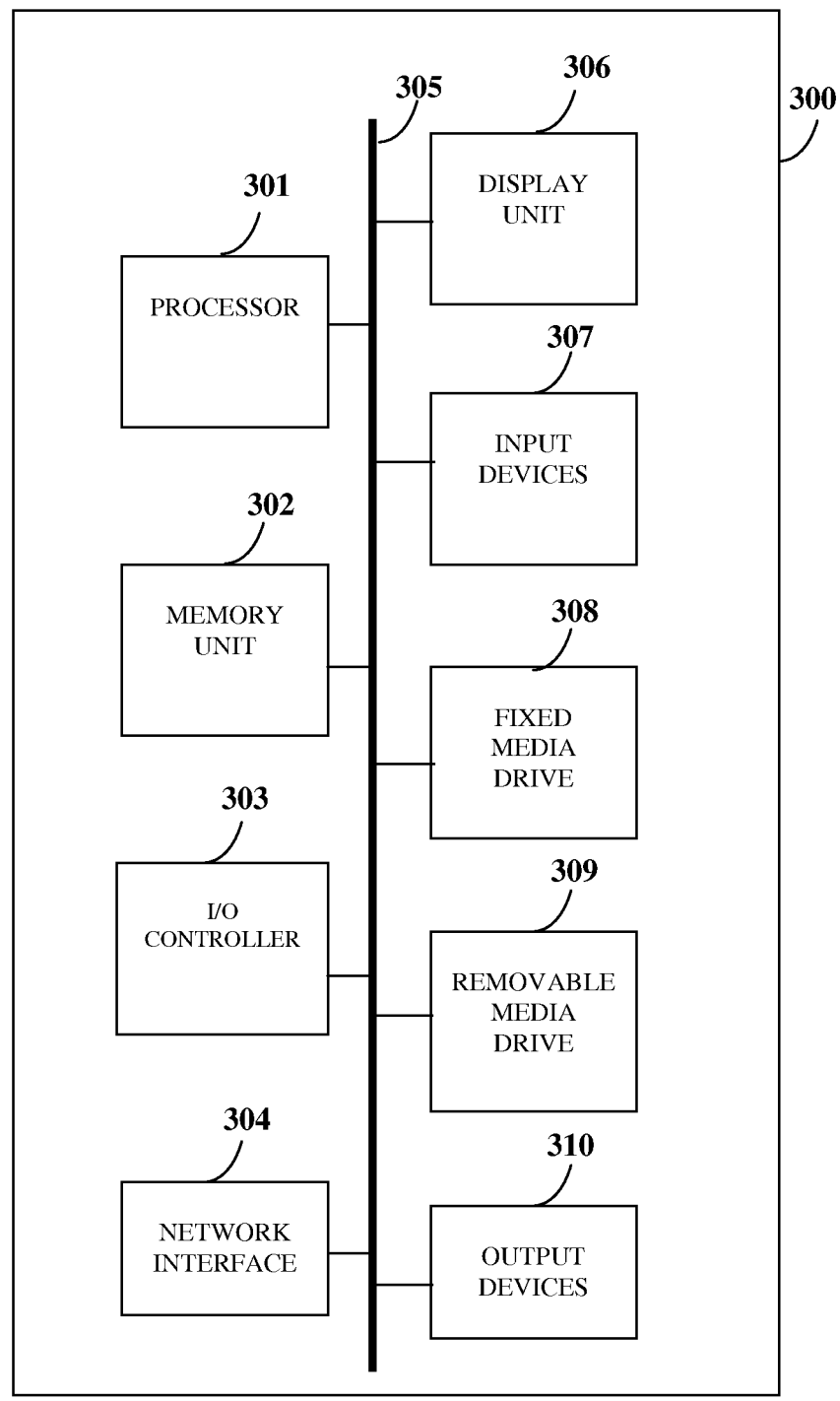
FIG. 3 exemplarily illustrates the architecture of a computer system employed by a training engine and a classification engine of the computer implemented system for classifying a document using confidence grades.

FIG. 3 exemplarily illustrates the architecture of a computer system 300 employed by a training engine 201 and a classification engine 202 of the computer implemented system 200 for classifying a document 205 using confidence grades. The computer system 300 comprises, for example, a processor 301, a memory unit 302 for storing programs and data, an input/output (I/O) controller 303, a network interface 304, a data bus 305, a display unit 306, input devices 307, output devices 310, etc.

The processor 301 is an electronic circuit that can execute computer programs. The memory unit 302 is used for storing programs, applications, and data. For example, the training engine 201 and the classification engine 202 are stored in the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to a network. The computer system 300 communicates with other computer systems through the network interface 304. The network interface 304 comprises, for example, a Bluetooth™ interface, an infrared (IR) interface, a WiFi interface, a universal serial bus interface (USB), a local area network (LAN) interface, a wide area network (WAN) interface, etc. The I/O controller 303 controls the input and output actions performed by a user. The data bus 305 permits communications between the modules, for example, 201a, 201b, 201c, 201d, 201e, and 201f of the training engine 201 and the modules, for example, 202a, 202b, 202c, 202d, and 202e of the classification engine 202 of the computer implemented system 200 disclosed herein.

The display unit 306 displays, via a graphical user interface, the results computed by the training engine 201 and the classification engine 202 to the user. The input devices 307 are used for inputting data into the computer system 300. The input devices 307 are, for example, a keyboard such as an alphanumeric keyboard, a joystick, a mouse, a touch pad, a light pen, etc.

The computer system 300 further comprises a fixed media drive 308 and a removable media drive 309 for receiving removable media. Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via a network. Computer applications and programs are executed by double clicking a related icon displayed on the display unit 306 using one of the input devices 307. The user interacts with the computer system 300 using the application interfaces of the display unit 306.

The computer system 300 employed by the training engine 201 and the classification engine 202 employs an operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the user using one of the input devices 307, the output display, files, and directories stored locally on the fixed media drive 308, for example, a hard drive. The operating system on the computer system 300 executes different programs, for example, a web browser, an electronic mail (email) application, etc., initiated by the user using the processor 301. The processor 301 retrieves the instructions for executing the modules, for example, 201a, 201b, 201c, 201d, 201e, and 201f of the training engine 201 and the modules, for example, 202a, 202b, 202c, 202d, and 202e of the classification engine 202 from the program memory in the form of signals. A program counter determines the location of the instructions in the program memory. The program counter stores a number that identifies the current position in the program of the modules, for example, 201a, 201b, 201c, 201d, 201e, and 201f of the training engine 201 and the modules, for example, 202a, 202b, 202c, 202d, and 202e of the classification engine 202.

The instructions fetched by the processor 301 from the program memory after being processed are decoded. The instructions are placed in an instruction register in the processor 301. After processing and decoding, the processor 301 executes the instructions. For example, the training engine 201 defines instructions for training the classifier 203 using multiple training documents 204. The first word extraction module 201a defines instructions for obtaining a list of first words from the training documents 204, where each of the training documents 204 are classified into one of multiple classes. The prior probability module 201b defines instructions for determining prior probability of each class belonging to the classes. The conditional probability calculation module 201c defines instructions for calculating conditional probabilities for the list of first words for each class. The constant definition module 201d defines instructions for defining threshold constants comprising, for example, a high threshold constant, a medium threshold constant, and a low threshold constant. The confidence threshold module 201e defines instructions for determining multiple confidence thresholds for the class using the list of first words, the prior probability of the class, and one of the threshold constants. The confidence grade definition module 201f defines instructions for defining confidence grades for the classes using the determined confidence thresholds.

The classification engine 202 uses the trained classifier 203 and defines instructions for classifying the document 205. The second word extraction module 202a defines instructions for obtaining a list of second words from the document 205, where the second words are commonly present in the list of first words. The conditional probability determination module 202b defines instructions for determining conditional probabilities for the list of second words for each of the classes from the calculated conditional probabilities for the list of first words. The posterior probability module 202c defines instructions for calculating a posterior probability for each of the classes using the determined prior probability and the determined conditional probabilities. The comparison module 202d defines instructions for comparing the calculated posterior probability with the determined confidence thresholds for each of the classes. The assignment module 202e defines instructions for assigning each of the classes to one of the defined confidence grades based on the comparison of calculated posterior probability and the determined confidence thresholds for each of the classes. The assignment module 202e defines instructions for assigning the document 205 to one of the classes as the result class of the document 205 based on the calculated posterior probability and the assigned confidence grades for each of the classes.

The processor 301 retrieves the instructions defined by the first word extraction module 201a, the prior probability module 201b, the conditional probability calculation module 201c, the constant definition module 201d, the confidence threshold module 201e, and the confidence grade definition module 201f of the training engine 201 and executes the instructions. The processor 301 also retrieves the instructions defined by the second word extraction module 202a, the conditional probability determination module 202b, the posterior probability module 202c, the comparison module 202d, and the assignment module 202e of the classification engine 202, and executes the instructions.

At the time of execution, the instructions stored in the instruction register are examined to determine the operations to be performed. The processor 301 then performs the specified operations. The operations include arithmetic and logic operations. The operating system performs multiple routines for performing a number of tasks required to assign the input devices 307, the output devices 310, and memory for execution of the modules, for example, 201a, 201b, 201c, 201d, 201e, and 201f of the training engine 201 and the modules, for example, 202a, 202b, 202c, 202d, and 202e of the classification engine 202. The tasks performed by the operating system comprise assigning memory to the modules, for example, 201a, 201b, 201c, 201d, 201e, and 201f of the training engine 201 and the modules, for example, 202a, 202b, 202c, 202d, and 202e of the classification engine 202 and data, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 201a, 201b, 201c, 201d, 201e, and 201f of the training engine 201 and the modules, for example, 202a, 202b, 202c, 202d, and 202e of the classification engine 202 are displayed to the user.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 301, except for a transitory, propagating signal.

The computer program product disclosed herein comprises multiple computer program codes for classifying a document 205 using multiple confidence grades. For example, the computer program product disclosed herein comprises a first computer program code for training a classifier 203 using multiple training documents 204, wherein each of the training documents 204 are classified into one of multiple classes. The computer program product disclosed herein further comprises a second computer program code for obtaining a list of first words from the training documents 204 and a list of second words from a document 205, a third computer program code for determining prior probability of each class belonging to the classes, a fourth computer program code for calculating conditional probabilities for each of the classes for the list of first words, a fifth computer program code for determining multiple confidence thresholds for each of the classes using the list of first words, the prior probability of the class, and one of the threshold constants, a sixth computer program code for defining confidence grades for the classes using the determined confidence thresholds, a seventh computer program code for determining conditional probabilities for the list of second words for each of the classes from the calculated conditional probabilities for the list of first words, an eighth computer program code for calculating a posterior probability for each of the classes using the prior probability and the determined conditional probabilities, a ninth computer program code for comparing the calculated posterior probability with the determined confidence thresholds for each of the classes and assigning each of the classes to the defined confidence grades based on the comparison of the calculated posterior probability with the determined confidence thresholds, and a tenth computer program code for assigning the document 205 to one of the classes based on the calculated posterior probability and the assigned confidence grades for each of the classes.

The computer program product disclosed herein further comprises additional computer program codes for performing additional steps that may be required and contemplated for classifying a document 205 using multiple confidence grades. In an embodiment, a single piece of computer program code comprising computer executable instructions performs one or more steps of the computer implemented method disclosed herein for classifying a document 205 using multiple confidence grades.

The computer program codes comprising the computer executable instructions for classifying a document 205 using multiple confidence grades are embodied on the non-transitory computer readable storage medium. The processor 301 of the computer system 300 retrieves these computer executable instructions and executes them. When the computer executable instructions embodied on the non-transitory computer readable storage medium are executed by the processor 301, the computer executable instructions cause the processor 301 to perform the method steps for classifying a document 205 using multiple confidence grades.

For purposes of illustration, the detailed description refers to the training engine 201 and the classification engine 202 being run locally on a computer system 300; however, the scope of the computer implemented method and system 200 disclosed herein is not limited to the training engine 201 and the classification engine 202 being run locally on the computer system 300 via the operating system and the processor 301, but may be extended to run remotely over a network by employing a web browser and a remote server, a mobile phone, or other electronic devices. The training engine 201 and the classification engine 202 may also be implemented on operating systems for mobile devices, for example, Windows Mobile®, Symbian, Google™ Android, or Apple® iPhone. Mobile implementation uses similar algorithms but may involve different hardware interfaces. The training engine 201 and the classification engine 202 may also be implemented on two different devices, for example, a desktop and a mobile device, to facilitate communication between them.

Figure 4A:
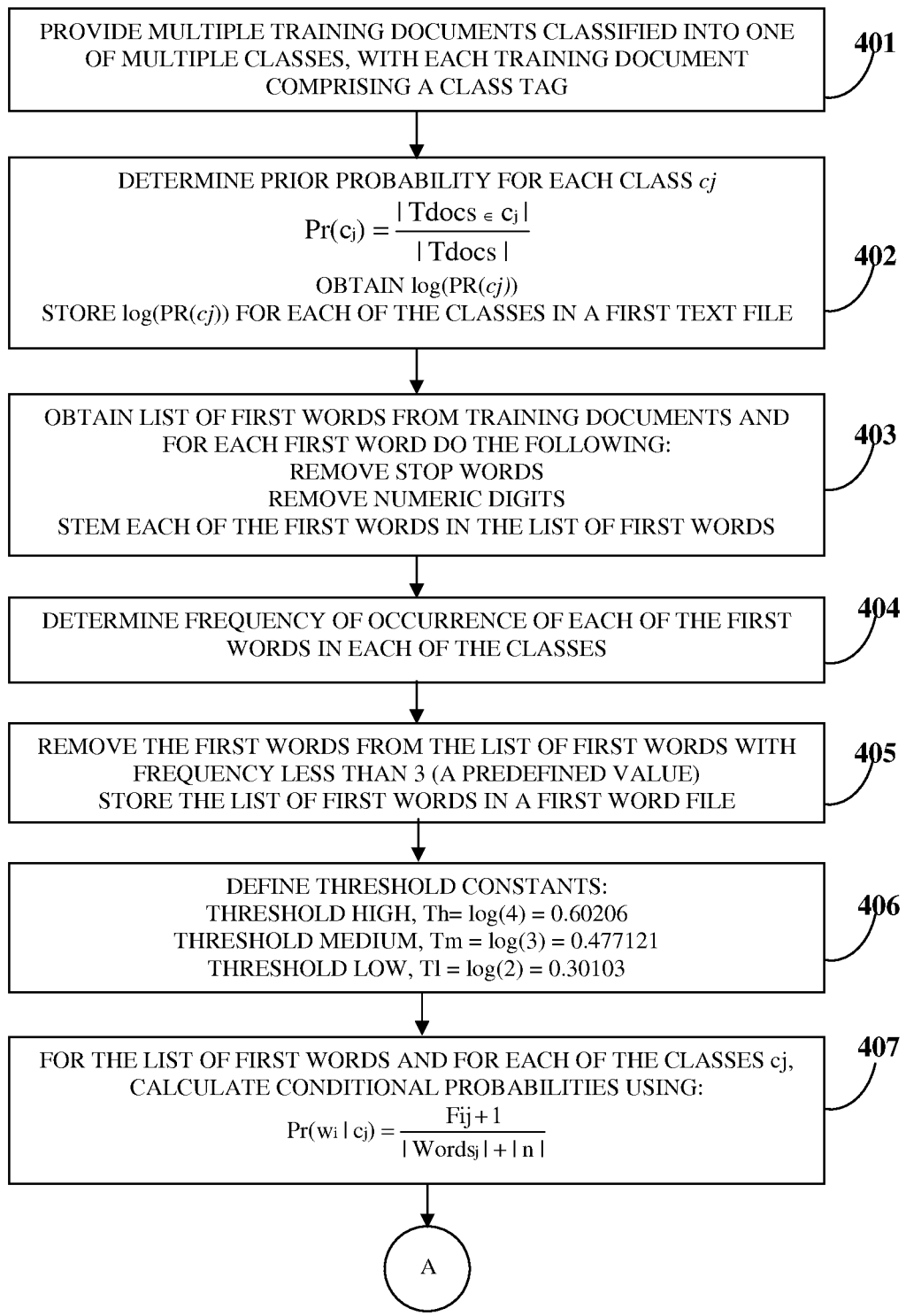
FIGS. 4A-4C exemplarily illustrate a flowchart for classifying a document using confidence grades.
Figure 4B:
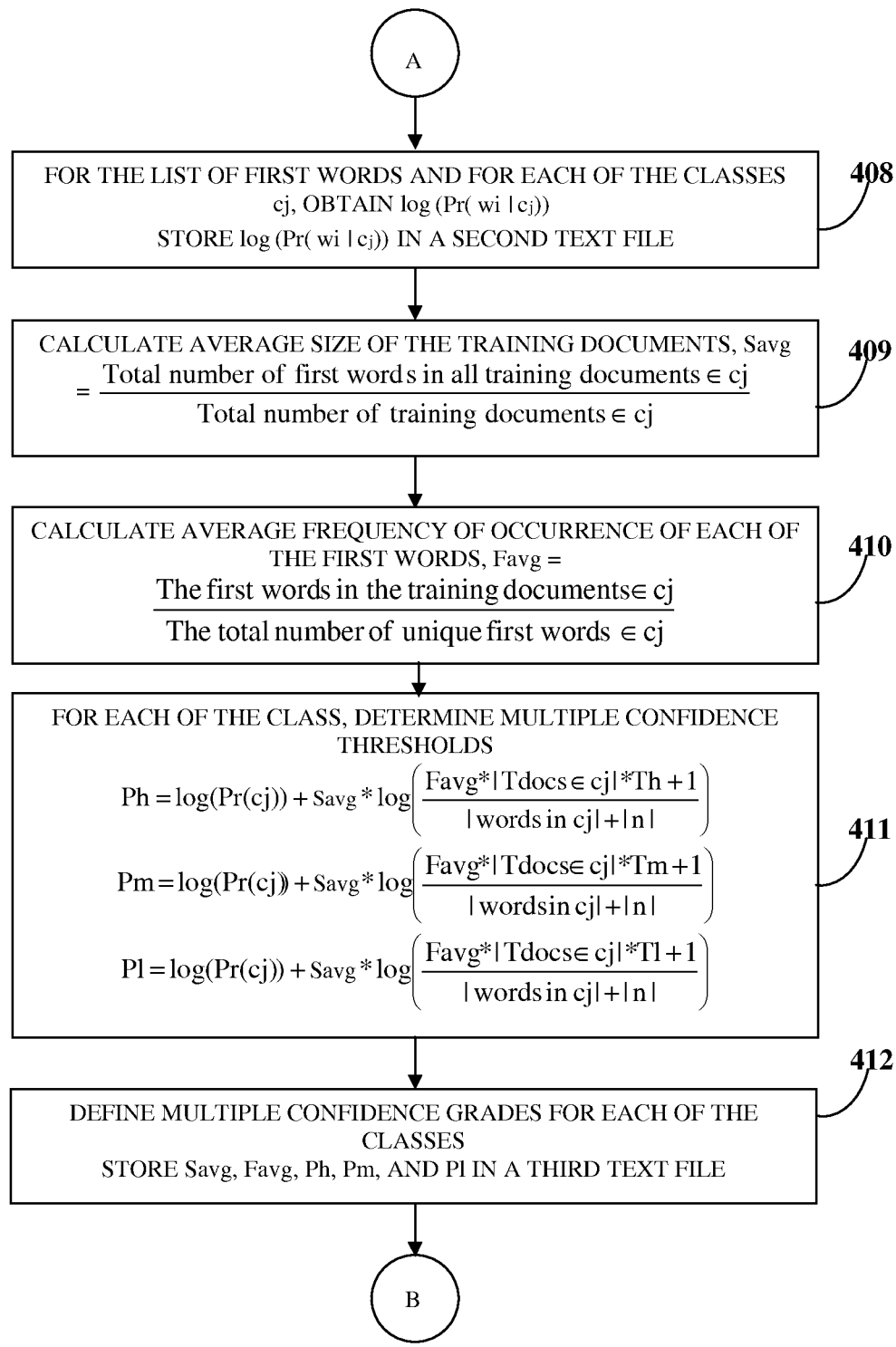
Figure 4C:
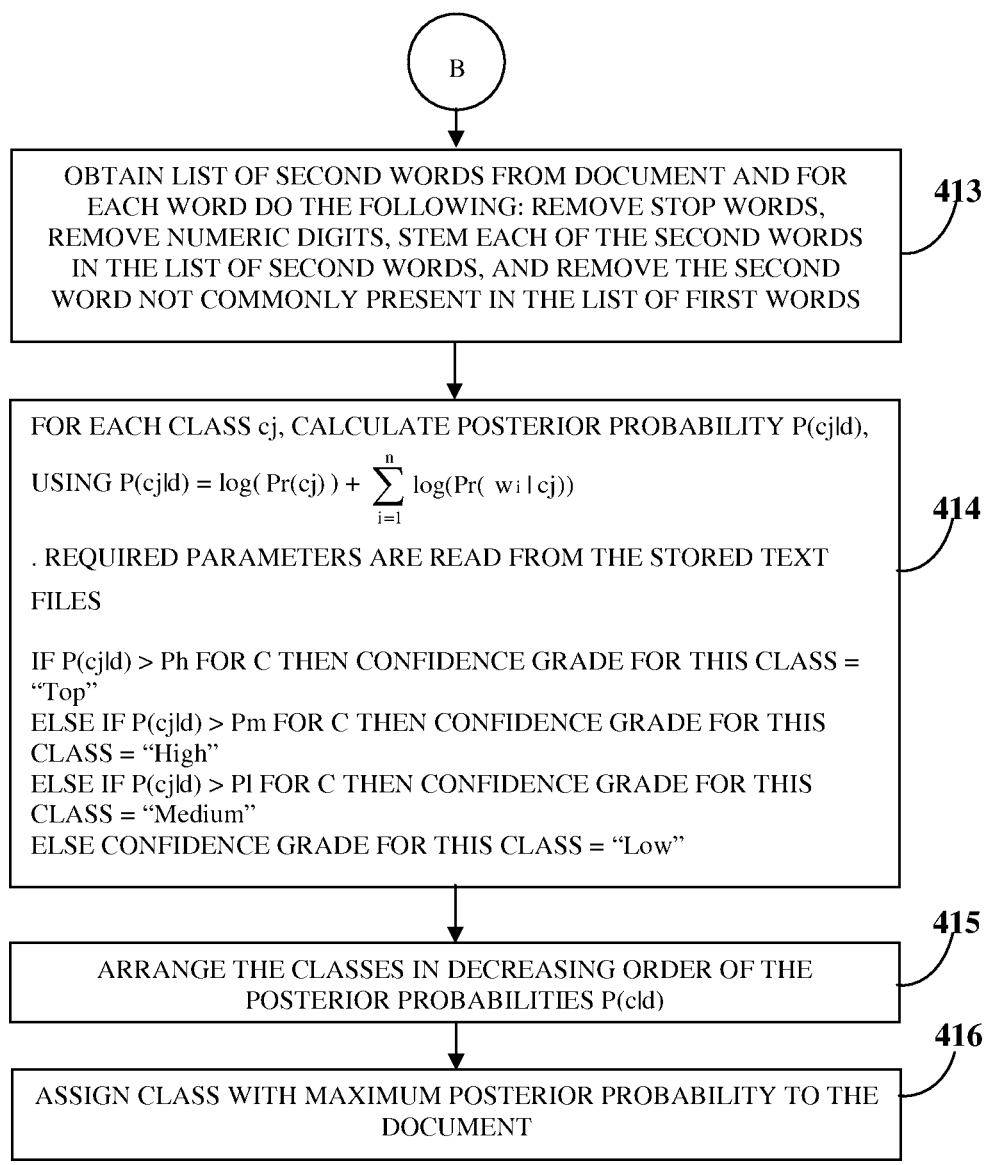

FIGS. 4A-4C exemplarily illustrate a flowchart for classifying a document 205 using confidence grades. Multiple training documents 204 classified into one of multiple classes are provided 401 to a classifier 203. Each of the training documents 204 comprises, for example, a class tag. A prior probability is determined 402 for each class using the training documents 204. A logarithm with base 10 is obtained for each prior probability determined for each of the classes and stored in a text file. A list of first words is obtained 403 from the training documents 204. The list of first words is modified by removing stop words and numeric digits in the list of first words. Each of remaining first words is stemmed. A frequency of occurrence is determined 404 for each of the first words in each of the classes. First words with the frequency of occurrence less than a predetermined value, for example, 3 are removed 405. The list of first words is stored in a first word file.

Multiple threshold constants are defined 406 based on empirical evaluations. The threshold constants comprise a high threshold constant (Th) with value of logarithm of 4 with base 10, a medium threshold constant (Tm) with value of logarithm of 3 with base 10, and a high threshold constant (Th) with value of logarithm of 2 with base 10. Conditional probabilities are calculated 407 for the list of first words for each of the classes. The logarithm with base 10 of the calculated conditional probabilities is obtained 408 for each of the classes and stored in a second text file. Average size of the training documents 204, Savg is calculated 409. The average frequency of occurrence of each of the first words, Favg is calculated 410.

Multiple confidence thresholds are determined 411 for each of the classes. The confidence thresholds comprise a high confidence threshold (Ph), a medium confidence threshold (Pm), and a low confidence threshold (Pl). Multiple confidence grades are defined 412 for each of the classes using the calculated confidence thresholds. The average size of the training documents 204, the average frequency of each of the first words, and the confidence thresholds of each of the classes is stored in a third text file. A list of second words is obtained 413 from the document 205. The stop words and numeric digits present in the list of first words are removed. Each of remaining second words is stemmed. The second words not commonly present in the list of first words are removed. The list of second words is stored in a second word file. Conditional probabilities for the list of second words for each of the classes are determined from the calculated conditional probabilities for the list of first words.

A posterior probability is calculated 414 for each of the classes using the prior probability and the determined conditional probabilities. The calculated posterior probability is compared with the determined confidence thresholds for each of the classes. The class is assigned with one of the confidence grades based on the comparison. The calculated posterior probabilities for each of the classes may then be arranged 415 in a decreasing order. The class with the maximum posterior probability or the calculated posterior probability comparatively greater than the calculated posterior probability of each of other classes is then assigned 416 as the result class of the document 205.

Consider an example of classifying a document 205 using confidence grades. Multiple classes of sports, science, and politics are considered. Let the class sport comprise the training document 1, training document 2, and training document 3. Let the class science comprises the training document 4, training document 5, training document 6, and training document 7. Let the class politics comprise the training document 8 and training document 9. The total number of training documents 204 is 9. The class names, training documents 204 belonging to each of multiple classes, and data in each of the training documents 204 are exemplarily illustrated in FIG. 5. A list of first words is obtained from the training documents 204. The list of first words is modified. The list of first words before and after removing stop words, numeric digits, and stemming each of the first words is exemplarily illustrated in FIG. 6. Consider the example of modifying the first words obtained from the training document 6. Data in the training document 6 is "Newton's Laws, Of Motion 55" as exemplarily illustrated in FIG. 5. The first words in the training document 6 obtained from the data are "Newton's", "Laws", "Of", "Motion" and "55" as exemplarily illustrated in FIG. 6. Stop word in the obtained list of first words is "Of". The stop word "Of" is removed from the list of first words. The numeric digit "55" is removed from the list of first words. Each of the remaining first words is stemmed. The stem of the remaining first words "Newton's", "Laws", and "Motion" are "Newton", "Law", and "Motion" respectively as exemplarily illustrated in FIG. 6.

A prior probability for each of the classes is then determined. The prior probability for the class sport, the class science, and the class politics is determined as 3/9, 4/9, and 2/9 respectively as exemplarily illustrated in FIG. 7. The first words with frequency of occurrence less than a predetermined value, for example, the first words with the frequency of occurrence less than 1, may be removed from the list of first words. For example, let each of first words in the list of first words have the frequency of occurrence greater than the predetermined value as exemplarily illustrated in FIG. 8. For example, the first word "Newton" in the list of first words has a frequency of occurrence greater than or equal to 1. Therefore, the first word "Newton" is retained in the list of first words. The total number of first words in the list of first words is 20. Conditional probabilities are calculated for the first words for each of the classes as exemplarily illustrated in FIG. 12. The conditional probabilities for of each of the first words provide the probability of occurrence of each of the first words in each of the classes.

Multiple confidence thresholds are determined for each of the classes using the list of first words, the prior probability of the class, and one of the threshold constants as exemplarily illustrated in FIG. 9. The high confidence threshold ($P_h$), the medium confidence threshold ($P_m$), and the low confidence threshold ($P_l$) for each of the classes are used to assign the confidence grades to each of the classes.

The trained classifier 203 classifies the document 205 as follows. A list of second words is obtained from the document 205. The second words are commonly present in the list of first words as exemplarily illustrated in FIG. 10. The second word "Pact" is removed from the list of second words, since it is not commonly present in the list of first words as exemplarily illustrated in FIG. 10. Consider the example of modifying the second words obtained from the document 205. The data in the document 205 is "Parliament 3 New Pacts" as exemplarily illustrated in FIG. 10. The second words obtained from the data in the document 205 are "Parliament", "3", "New", and "Pacts". The stop word in the obtained list of second words is "New". The stop word "New" is removed from the list of second words as exemplarily illustrated in FIG. 10. The numeric digit "3" is removed from the list of second words as exemplarily illustrated in FIG. 10. Each of the remaining second words is stemmed. The stem of the remaining second words "Parliament" and "Pacts" are "Parliament" and "Pact" respectively is exemplarily illustrated in FIG. 10.

Conditional probabilities for the list of second words for each of the classes are determined from the calculated conditional probabilities for the list of first words. The trained classifier 203 then calculates a posterior probability for each of the classes using the prior probability and the determined conditional probabilities as exemplarily illustrated in FIG. 11. The posterior probability for the classes sport, science, and politics is calculated as follows:

$$P(\text{sport} | \text{new document}) = \log(P(\text{sport})) + \log(P(\text{`parliament'} | \text{sport}))$$
$$= \log(3/9) + \log(1/(6+20)) =$$
$$= -1.89209$$

$$P(\text{science} | \text{new document}) = \log(P(\text{science})) +$$
$$\log(P(\text{`parliament'} | \text{science}))$$
$$= \log(4/9) + \log(1/(10+20))$$
$$= -1.82930$$

$$P(\text{politics} | \text{new document}) = \log(P(\text{politics})) +$$
$$\log(P(\text{`parliament'} | \text{politics}))$$
$$= \log(2/9) + \log((1+1)/(4+20))$$
$$= -1.73239$$

For each of the classes, the calculated posterior probability is compared with the determined confidence thresholds. A confidence grade is given for each comparison, as exemplarily illustrated in FIG. 11. The confidence grade for the classes sport, science, and politics is, for example, given as follows: Confidence(sport| new document)="Top"

Confidence(science| new document)="Top"
Confidence(politics| new document)="Top"

The posterior probabilities are arranged in decreasing order. The class politics has the highest arranged posterior probability. The class politics is therefore assigned as the result class of the document 205. The trained classifier 203 classifies the document 205 by assigning the document 205 to the class politics.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

The foregoing examples have been provided merely for the purpose of explanation and are in no way to be construed as limiting of the present computer implemented method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for classifying a document using a plurality of confidence grades, comprising:
    providing a training engine and a classification engine employing a computer system for classifying said document using said plurality of confidence grades, wherein said computer system further comprises a processor, a memory unit for storing programs and data, an input/output (I/O) controller, a network interface, and a data bus;
    training a classifier by said training engine using a plurality of training documents, wherein training said classifier comprises:
        obtaining a list of first words from said training documents, wherein each of said training documents is classified into one of a plurality of classes;
        for each class belonging to said classes:
            determining a prior probability of said class, wherein said prior probability is probability of occurrence of said training documents in said class given said training documents in said classes;
            calculating conditional probabilities for said list of first words;
            calculating a minimum posterior probability and a maximum posterior probability for said class;
            defining multiple threshold constants by evaluating empirically said calculated minimum and maximum posterior probabilities across a number of experimentations;
            determining a plurality of confidence thresholds using said list of first words, said prior probability of said class, and one of said multiple threshold constants; and
            defining said confidence grades using said determined confidence thresholds;
    classifying said document by said classification engine using said trained classifier, wherein classifying said document comprises:
        obtaining a list of second words from said document, wherein said second words are commonly present in said list of first words;
        determining conditional probabilities for said list of second words for each of said classes from said calculated conditional probabilities for said list of first words;
        calculating a posterior probability for each of said classes using said prior probability and said determined conditional probabilities;
        comparing said calculated posterior probability with said determined confidence thresholds for each of said classes;
        assigning each of said classes to one of said defined confidence grades based on said comparison of said calculated posterior probability with said determined confidence thresholds; and assigning said document to one of said classes based on said calculated posterior probability and said assigned confidence grades for each of said classes;

whereby said document is classified into one of said classes using said confidence grades.

2. The computer implemented method of claim 1, wherein said classifier is a Naïve Bayes classifier.

3. The computer implemented method of claim 1, wherein said prior probability is a ratio of number of training documents in a class to total number of training documents.

4. The computer implemented method of claim 1, wherein said confidence thresholds are determined for each of said classes based on average frequency of occurrence of each of said first words and average size of each of said training documents.

5. The computer implemented method of claim 1, further comprising modifying said list of first words, comprising:
   removing stop words from said list of first words;
   removing numeric digits from said list of first words;
   stemming each of said first words in said list of first words; and
   determining frequency of occurrence of each of said first words in each of said classes, wherein said first words with said frequency of occurrence less than a predetermined value are removed from said list of first words.

6. The computer implemented method of claim 1, further comprising modifying said list of second words, comprising:
   removing stop words from said list of second words;
   removing numeric digits from said list of second words; and
   stemming each of said second words in said list of second words.

7. The computer implemented method of claim 1, wherein each of said training documents comprise a class tag representing said class to which said document belongs, wherein said class tag comprises a class description and a class code.

8. The computer implemented method of claim 1, further comprising defining said threshold constants, wherein said threshold constants comprise a high threshold constant, a medium threshold constant, and a low threshold constant.

9. A computer implemented system for classifying a document using a plurality of confidence grades, comprising:
   a training engine and a classification engine employing a computer system for classifying said document using said plurality of confidence grades, wherein said computer system further comprises a processor, a memory unit for storing programs and data, an input/output (I/O) controller, a network interface, a data bus, a display unit, input devices, and output devices;
   said training engine that trains a classifier using a plurality of training documents, comprising:
      a first word extraction module that obtains a list of first words from said training documents, wherein each of said training documents are classified into one of a plurality of classes;
      a prior probability module that determines prior probability of each class belonging to said classes, wherein said prior probability is probability of occurrence of said training documents in said class given said training documents in said classes;
      a conditional probability calculation module that calculates conditional probabilities for said list of first words;
      a posterior probability module that calculates minimum posterior probability and maximum posterior probability for said classes;
      a constant definition module that evaluates empirically said calculated minimum and maximum posterior probabilities across a number of experimentations and defines multiple threshold constants;
      a confidence threshold module that determines a plurality of confidence thresholds for said class using said list of first words, said prior probability of said class, and one of said multiple threshold constants; and
      a confidence grade definition module that defines confidence grades for said classes using said determined confidence thresholds;
   said classification engine that classifies said document using said trained classifier, comprising:
      a second word extraction module that obtains a list of second words from said document, wherein said second words are commonly present in said list of first words;
      a conditional probability determination module that determines conditional probabilities for said list of second words for each of said classes from said calculated conditional probabilities for said list of first words;
      a posterior probability module that calculates a posterior probability for each of said classes using said prior probability and said determined conditional probabilities;
      a comparison module that compares said calculated posterior probability with said determined confidence thresholds for each of said classes;
      an assignment module that assigns each of said classes to one of said defined confidence grades based on said comparison of said calculated posterior probability with said determined confidence thresholds; and
      said assignment module that assigns said document to one of said classes based on said calculated posterior probability and said assigned confidence grades for each of said classes.

10. The computer implemented system of claim 9, wherein said classifier is a Naïve Bayes classifier.

11. The computer implemented system of claim 9, wherein said training engine further comprises a constant definition module that defines said threshold constants, wherein said threshold constants comprise a high threshold constant, a medium threshold constant, and a low threshold constant.

12. The computer implemented system of claim 9, wherein said first word extraction module performs:
   removing stop words from said list of first words;
   removing numeric digits from said list of first words;
   stemming each of said first words in said list of first words; and
   determining frequency of occurrence of each of said first words in each of said classes, wherein said first words with said frequency of occurrence less than a predetermined value are removed from said list of first words.

13. The computer implemented system of claim 9, wherein said second word extraction module performs:
   removing stop words from said list of second words;
   removing numeric digits from said list of second words; and
   stemming each of said first words in said list of second words.

14. A computer program product comprising computer executable instructions embodied in a non-transitory computer readable storage medium, said instructions being executable by a processor to perform a method for classifying a document using a plurality of confidence grades, said method comprising:

training a classifier by a training engine using a plurality of training documents, wherein said training said classifier comprises:
obtaining a list of first words from said training documents, wherein each of said training documents is classified into one of a plurality of classes;
for each class belonging to said classes:
determining prior probability of said class, wherein said prior probability is probability of occurrence of said training documents in said class given said training documents in said classes;
calculating conditional probabilities for said list of first words;
calculating a minimum posterior probability and a maximum posterior probability for said class;
defining multiple threshold constants by evaluating empirically said calculated minimum and maximum posterior probabilities across a number of experimentations;
determining a plurality of confidence thresholds using said list of first words, said prior probability of said class, and one of said multiple threshold constants; and
defining said confidence grades using said determined confidence thresholds;
classifying said document by a classification engine using said trained classifier, wherein classifying said documents comprises:
obtaining a list of second words from said document, wherein said second words are commonly present in said list of first words;
determining conditional probabilities for said list of second words for each of said classes from said calculated conditional probabilities for said list of first words;
calculating a posterior probability for each of said classes using said prior probability and said determined conditional probabilities;
comparing said calculated posterior probability with said determined confidence thresholds for each of said classes;
assigning each of said classes to said defined confidence grades based on said comparison of said calculated posterior probability with said determined confidence thresholds; and
assigning said document to one of said classes based on said calculated posterior probability and said assigned confidence grades for each of said classes.

* * * * *